Aug. 16, 1966  E. F. WEBB  3,266,735
NOZZLE DEVICE FOR WINDSHIELD CLEARING SYSTEMS
Original Filed Jan. 14, 1963  2 Sheets-Sheet 1
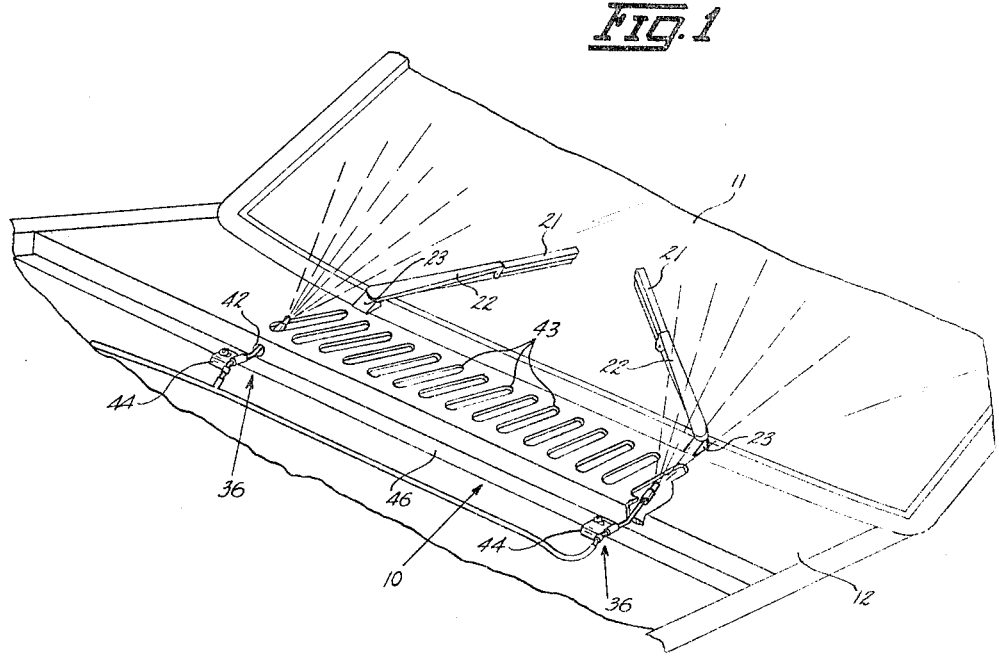
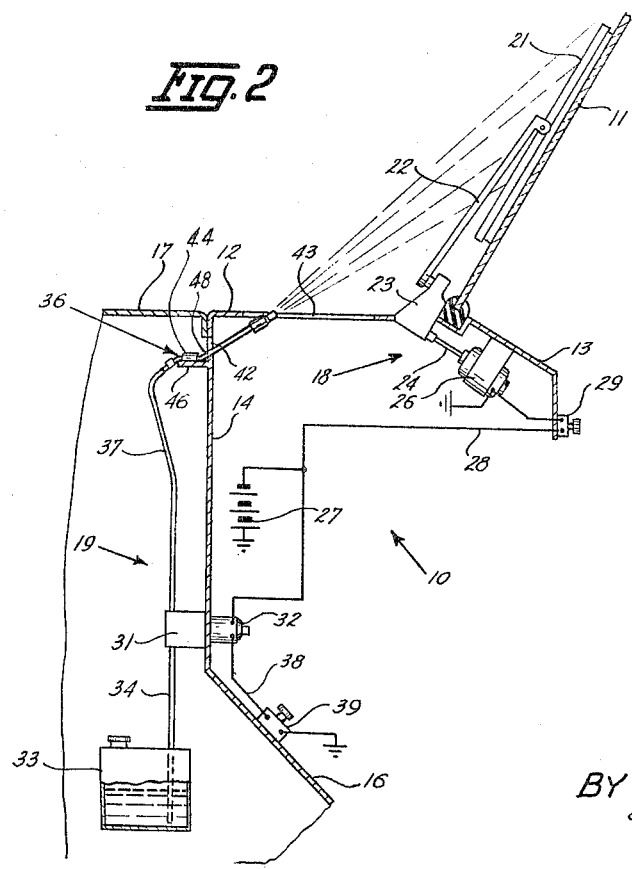
INVENTOR.
EDMOND F. WEBB
BY Rudolph L. Lowell
ATTORNEY.

Aug. 16, 1966 — E. F. WEBB — 3,266,735
NOZZLE DEVICE FOR WINDSHIELD CLEARING SYSTEMS
Original Filed Jan. 14, 1963 — 2 Sheets-Sheet 2
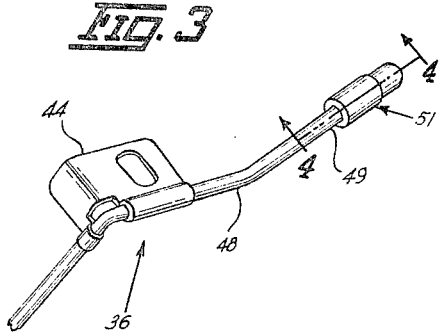
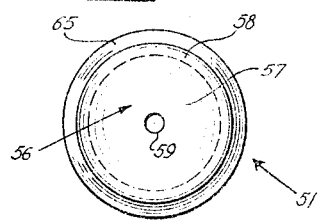
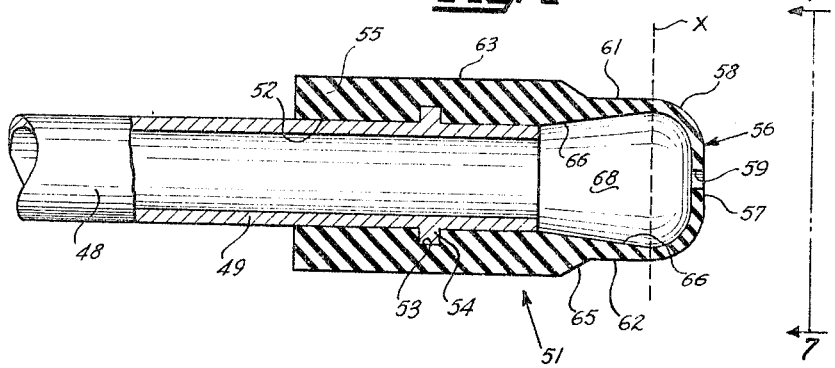
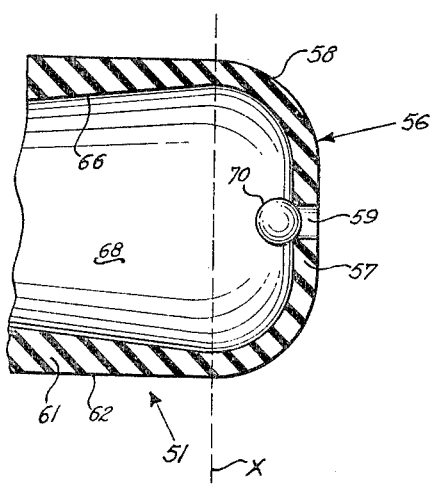
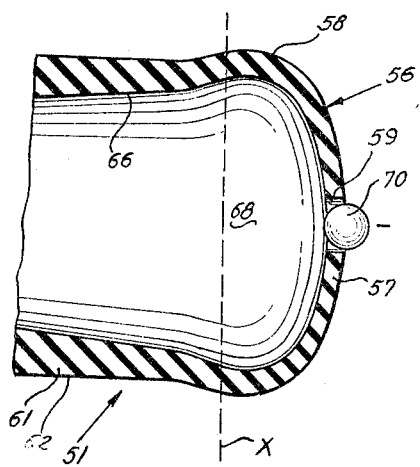
INVENTOR.
EDMOND F. WEBB
BY *Rudolph L. Lowell*
ATTORNEY.

United States Patent Office 3,266,735
Patented August 16, 1966

3,266,735
NOZZLE DEVICE FOR WINDSHIELD CLEARING SYSTEMS
Edmond F. Webb, Franklin, Mich., assignor to The Delman Company, Cookeville, Tenn., a corporation of Tennessee
Continuation of application Ser. No. 251,092, Jan. 14, 1963. This application Dec. 4, 1964, Ser. No. 416,031
2 Claims. (Cl. 239—284)

This application is a continuation of application Serial No. 251,092 filed January 14, 1963 and now abandoned.

This invention relates to windshield clearing systems and more particularly to a nozzle unit for directing washing fluid onto the windshield of a vehicle.

It is an object of the invention to provide an improved fluid dispensing nozzle unit.

Another object of the invention is to provide a windshield clearing system with at least one nozzle unit having a replaceable and self-cleaning fluid dispensing cap portion.

A further object of the invention is to provide a nozzle unit having a resilient discharge portion which automatically ejects solid materials to purge the nozzle unit of clogging solid materials.

Another object of the invention is to provide in a fluid pressure windshield washing system a nozzle means which is operative to maintain a uniform fluid pressure in the system and to maintain a substantially uniform flow of washing fluid onto the windshield.

An additional object of the invention is to provide a rugged and durable nozzle unit which is reliable and efficient in use and relatively simple and economical in construction and cost of installation.

Further objects, features and advantages of this invention will appear from the following description when taken in connection with the accompanying drawings, in which:

FIG. 1 is a fragmentary longitudinal sectional view of a vehicle showing a windshield clearing system, embodying the nozzle unit of this invention;

FIG. 2 is a fragmentary perspective view of a pair of nozzle units of the invention in assembled relation with a vehicle;

FIG. 3 is an enlarged perspective view of the nozzle unit of FIG. 1;

FIG. 4 is an enlarged sectional view of an attachable discharge cap portion in assembled relation with the tubular body member of the nozzle unit of FIG. 3;

FIG. 5 is an enlarged showing of the cap portion of FIG. 4 with the fluid discharge orifice clogged or closed by a particle of dirt;

FIG. 6 is illustrated similar to FIG. 5 and shows a particle of dirt being discharged through the discharge orifice; and FIG. 7 is an end view taken along line 7—7 of FIG. 4.

Referring to the drawings, there is shown in FIG. 1 a windshield clearing system indicated generally by numeral 10 in assembled relation with a motor vehicle. The vehicle has an upwardly extended windshield 11 positioned rearwardly of a cowl 12 and in front of a dashboard 13. A fire wall 14 extends downwardly from the cowl 12 into a toe board 16. A hood 17 extends forward from the cowl 12 and covers the engine cavity of the vehicle.

The windshield clearing system 10 comprises a wiping unit and a washing unit indicated generally by the numerals 18 and 19, respectively. The wiper unit 18 includes wiper blades 21 held in engagement on the outer surface of the windshield 11 by arms 22. A force transmitting assembly 23 mounted on the cowl 12 adjacent the windshield 11 is connected to the lower end of an arm 22 and the drive shaft 24 of an electric motor 26. In operation, the electric motor 26 drives the force transmitting assembly 23 to angularly reciprocate the arms 22 thereby reciprocating the blades 21 over the windshield 11. The motor 26 is connected to the vehicle's battery 27 by an electrical conductor 28 having a hand operated switch 29 interposed therein. The switch 29 is mounted on the dashboard 13 where it is readily accessible by the vehicle operator.

The washer unit 19 has a fluid pump assembly 31 which is driven by an electric motor 32. The pump assembly 31 draws washing fluid from a reservoir 33 through a fluid line 34 which extends into the reservoir and forces the fluid through nozzle units 36 connected to the pump assembly 31 by a fluid line 37 and onto the windshield 11 in the path of movement of the wiper blades 21. The electric motor 32 is connected to the battery 27 by a conductor 38 having interposed therein a foot switch 39 mounted on the toe board 16. When the operator of the vehicle actuates the switch 39 the electrical circuit for the motor 32 is closed thereby energizing the motor and operating the pump assembly 31 to displace the fluid in the reservoir 33 through the nozzle 36 onto the windshield 11.

Each nozzle unit projects through a hole 42 in the fire wall 14 and extends up to the ventilating and heater air intake opening 43 formed in the cowl 12. A metal clip 44 secures a nozzle unit to a forwardly extending section 46 of the fire wall 14.

A nozzle unit 36 has an angularly shaped tubular body 48 with a cylindrical head end 49 (FIG. 3). A metal clip 44 is clamped around the central section of the tubular body 48 on angularly disposed portions thereof to inhibit rotation of the tubular body 48 relative to the clip 44. A fluid dispensing cap 51 over the end of the tubular body 48 is formed from resilient and deformable material, such as natural or synthetic rubber.

Because the bore 52 of the cap 51 is of a smaller diameter than the outer diameter of head end 49, the cap is stretched over the head end during assembly to form a fluid seal therewith as shown in FIG. 4. The inner peripheral surface of the cap 51 has an angular groove 53 which cooperates with an annular bead or tongue 54 on the outer peripheral surface of the head end 49 to prevent axial movement between the head end 49 and the cap 51.

The cap 51 comprises a deformable and resilient body member defining a heavy tubular sleeve section 55 which telescopes over the head 49 of the tubular body 48 and a cup or dome-shaped head section 56 of uniform wall thickness having a substantially flat circular or disc-shape end portion 57 and a curved annular side wall 58. The end portion 57 covers approximately ten percent of the head section 56 area and has a fluid discharge orifice 59 located centrally thereof (FIG. 7). The side wall 58 of the dome-shaped head section 56 is integrally connected with the sleeve section 55 by an annular neck section 61, the junction of the neck section 61 and the side wall 58 being along the broken line indicated as "X," in FIG. 4.

The annular neck section 61 has its outer peripheral surface 62 concentric to and smaller than the outer peripheral surface 63 of the sleeve section 55 and connected thereto through the tapered surface 65 of the sleeve section. The inner peripheral surface 66 of the neck section 61 is tapered outwardly from the bore 52 of the sleeve section 55 to the head section 56 to form a bulb-shaped fluid chamber 68. It is seen, therefore, that the cross sectional area of the bulb-shaped chamber 68 progressively increases and the neck section 61 wall thickness progressively decreases from the sleeve section 55 to the end portion 57.

The durometer value and tensile strength of the rubber material are correlated with the wall thickness of the head section 56, the pump pressure, and the size of the fluid dispensing orifice 59 to prevent expansion of the head section 56 under normal operating conditions (FIG. 5). A cap 51 made of synthetic rubber having a fluid discharge orifice diameter of .025 inch and functioning under a pump pressure of 15 p.s.i. results in ideal operating characteristics. The fluid pressure in the washer unit 19 is a function of the pumping capacity of the pump assembly 31 and the number and discharge capacity of the fluid directing nozzle units 36.

In the normal operation of the washer unit 19, the electric motor 32 is energized by the actuation of the foot switch 39 thereby driving the pump assembly 31 to draw cleaning fluid from the reservoir through lines 34, 37 to discharge from the nozzle units 36. Each nozzle unit directs the fluid under constant pressure greater than atmospheric onto the windshield 11 through the discharge orifice 59.

When the fluid discharging orifice 59 is clogged or blocked with solid material 70, such as ice or dirt, as shown in FIG. 5, the predetermined fluid pressure in the chamber 68 will increase above the normal operating pressure as the discharge capacity of the system is decreased. The increase in pressure in the chamber 68 spherically or radially expands the annular side wall 58 and flat end portion 57 thereby increasing the diameter of the discharge orifice 59. As the curved side wall 58 forms the greater part of the head section 56, the force created by the pressure increase has a large component urging the head section 56 spherically outward and only a small axial component tending to move the end portion 57. This results in a maximum diametrical increase of the discharge orifice 59 from a given fluid pressure increase. With the orifice 59 enlarged as shown in FIG. 6, the solid material 70 is ejected from the cap 51 as shown by the arrow thereby automatically purging the fluid system of material which inhibits the proper dispensing of windshield washing fluid. After the solid material 70 has been expelled from the cap 51 the fluid pressure in the chamber 68 drops back to normal operating pressure causing the spherically deformed flat end portion 57 and annular side wall 58 to return to their normal shape thereby reducing the diameter of the orifice 59 back to its normal operating size.

From the above description it can be seen that each nozzle unit includes a resilient cap 51 formed with a heavy tubular sleeve 55, a relatively thin and resilient cup-shaped head 56 and an annular neck 61 integrally connecting the sleeve 55 with the head 56. The neck 61 has a tapered wall which reduces in thickness from the sleeve 55 to the head 56 thereby progressively reducing the elastic strength of the walls of the neck 61 toward the cup-shaped head 56 to inhibit radial expansion of the annular neck 61 and provide for radial expansion of the head 56. The resilient cap 51 of each nozzle unit functions to automatically maintain a predetermined fluid pressure in the washer unit 19. An increase of the pressure radially expands clogged or fouled caps thereby dislodging and expelling the clogging material therein.

Although the invention has been described with respect to the preferred embodiment thereof, it is to be understood that it is not to be so limited since changes can be made therein which are within the full intended scope of this invention as defined in the appended claims.

I claim:
1. A fluid dispensing cap formed from deformable, resilient material for use in a fluid dispensing windshield washer system having a tubular body member connected to a source of fluid under pressure greater than atmospheric under normal operating conditions comprising a sleeve section adapted to fit over an end of the tubular body member forming a fluid seal therewith, a cup-shaped head section of uniform wall thickness, a flat disc-shaped end portion comprising a minor part of the total area of said head section, said end portion having a cylindrical discharge orifice formed centrally thereof, a curved annular side wall portion extending from said end portion and comprising a major part of the total area of said head section, an annular neck section connecting said sleeve section with said curved annular side wall portion, said neck section constituting an extension of said sleeve section and having a tapered side wall provided with a thickness progressively decreasing from the sleeve section to the junction of said neck section with said side wall portion, thereby enabling said side wall portion to be expanded to a greater degree than said neck section when said discharge orifice is internally blocked by foreign matter and, in turn, enabling said end portion to expand to increase the size of the discharge orifice thereby enabling the foreign matter to pass through the orifice, when the fluid pressure in the cap is increased above a normal predetermined operating pressure.

2. A fluid dispensing cap as recited in claim 1, in which said end portion comprises substantially ten percent of the total area of said head section.

References Cited by the Examiner

UNITED STATES PATENTS

| | | | |
|---|---|---|---|
| 2,373,555 | 4/1945 | Folke | 239—534 |
| 2,443,560 | 6/1948 | Goodson | 128—252 |
| 2,616,581 | 11/1952 | Madsen | 128—252 |
| 3,009,648 | 11/1961 | Hait | 239—602 |

FOREIGN PATENTS 832,418    4/1960    Great Britain.

M. HENSON WOOD, Jr., *Primary Examiner.*

EVERETT W. KIRBY, *Examiner.*

D. L. MOSELEY, V. C. WILKS, *Assistant Examiners.*